(12) United States Patent
Shaver et al.

(10) Patent No.: US 9,014,249 B2
(45) Date of Patent: Apr. 21, 2015

(54) COMMUNICATIONS RECEIVER WITH CHANNEL IDENTIFICATION USING A-PRIORI GENERATED GAIN VECTORS AND ASSOCIATED METHODS

(71) Applicant: Harris Corporation, Melbourne, FL (US)

(72) Inventors: Joseph B Shaver, Rochester, NY (US); John Wesley Nieto, Rochester, NY (US); Michael Patrick Snook, Walworth, NY (US)

(73) Assignee: Harris Corporation, Melbourne, FL (US)

( * ) Notice: Subject to any disclaimer, the term of this patent is extended or adjusted under 35 U.S.C. 154(b) by 230 days.

(21) Appl. No.: 13/667,399

(22) Filed: Nov. 2, 2012

(65) Prior Publication Data
US 2014/0126621 A1    May 8, 2014

(51) Int. Cl.
*H03H 7/30* (2006.01)
*H03K 5/159* (2006.01)
*H04L 25/02* (2006.01)
*H04L 25/03* (2006.01)
*H04L 25/05* (2006.01)

(52) U.S. Cl.
CPC ........ *H04L 25/0212* (2013.01); *H04L 25/0246* (2013.01); *H04L 25/03019* (2013.01); *H04L 25/05* (2013.01)

(58) Field of Classification Search
CPC ..................... H04L 25/0212; H04L 25/03254; H04L 25/03292; H04L 2025/03433; H04L 2025/03592; H04L 2025/03611; H04L 2025/03649; H04L 2025/03656
USPC .......... 375/230–234, 340, 341, 346, 348, 350
See application file for complete search history.

(56) References Cited

U.S. PATENT DOCUMENTS

| 5,303,263 | A  | * | 4/1994 | Shoji et al. ................... 375/229 |
| 5,323,335 | A  |   | 6/1994 | Mitchell |
| 5,432,816 | A  |   | 7/1995 | Gozzo |
| 6,675,187 | B1 |   | 1/2004 | Greenberger |
| 7,050,513 | B1 |   | 5/2006 | Yakhnich |
| 7,099,911 | B2 |   | 8/2006 | Schmidt et al. |
| 7,684,523 | B2 |   | 3/2010 | Wang et al. |
| 7,907,683 | B2 |   | 3/2011 | Merched et al. |

(Continued)

OTHER PUBLICATIONS

Shoaib et al., "Solution to the weight extraction problem in fast QR-decomposition RLS algorithms", Speech and Signal Processing, IEEE, May 2006, pp. 111572-111575.

*Primary Examiner* — David B. Lugo
(74) *Attorney, Agent, or Firm* — Allen, Dyer, Doppelt, Milbrath & Gilchrist, P.A.

(57) ABSTRACT

A communications receiver includes an antenna, and a burst signal acquisition circuit coupled to the antenna to detect a burst signal received over a wireless communications channel. The burst signal has a burst structure that includes channel-corrupted known preamble bits, channel-corrupted known probe bits and channel-corrupted unknown data bits. A channel estimator is coupled to the burst signal acquisition circuit to generate a-priori a gain vector based on uncorrupted known probe bits, and to perform a recursive least squares (RLS) operation to determine an impulse response of the wireless communications channel based on the channel-corrupted known probe bits and the gain vector. A maximum likelihood sequence estimator (MLSE) or equalizer is coupled to the channel estimator and the burst signal acquisition circuit.

22 Claims, 3 Drawing Sheets

(56) References Cited

U.S. PATENT DOCUMENTS

| | | | |
|---|---|---|---|
| 7,978,759 B1 * | 7/2011 | Sarrigeorgidis | 375/232 |
| 7,979,673 B2 | 7/2011 | Fitton | |
| 8,473,539 B1 * | 6/2013 | Rao et al. | 708/522 |
| 2002/0110188 A1 | 8/2002 | Ohmori et al. | |
| 2005/0185743 A1 | 8/2005 | Li | |
| 2010/0250640 A1 | 9/2010 | Seki | |

* cited by examiner

COMMUNICATIONS RECEIVER WITH CHANNEL IDENTIFICATION USING A-PRIORI GENERATED GAIN VECTORS AND ASSOCIATED METHODS

FIELD OF THE INVENTION

The present invention relates to the field of wireless communications, and more particularly, to a communications receiver with a channel estimator for identifying a wireless communications channel and related methods.

BACKGROUND OF THE INVENTION

Wireless communications receivers typically use maximum likelihood sequence estimators (MLSE) or equalizers to address intersymbol interference caused by time dispersion of the wireless communications channels. Wireless communications channels may be characterized as time dispersive, frequency selective fading channels. The characteristics of such communications channels may change significantly during transmission of a message, such as messages sent via burst signals.

The communications channel is tracked during transmission of the burst signal so that good performance can be achieved. Consequently, many systems use some form of communications channel tracking that is intended to update a model of the communications channel during transmission of each burst signal to achieve better performance.

Variations in the burst signal can be directly related to the impulse response of the communications channel. The impulse response is a wideband channel characterization and contains information necessary to simulate or analyze any type of radio transmission through the communications channel. This stems from the fact that a communications channel may be modeled as a linear filter with a time varying impulse response. The filtering nature of the communications channel is caused by the summation of amplitudes and delays of the multiple arriving burst signals at any instant in time. The impulse response is a useful characterization of the communications channel.

Several adaptive type algorithms are commonly used for communications channel tracking in wireless communications receivers. These algorithms are used to periodically update the communications channel estimate during processing of the burst signal. The most common algorithms include least means squares (LMS) and recursive least squares (RLS). LMS based algorithms use an instantaneous approximation to the gradient of the optimization space. However, this makes LMS based algorithms more susceptible to noise and requires a large number of iterations to converge.

RLS based algorithms are known to have better convergence properties and are asymptotically optimal. The good convergence properties of the RLS algorithm is due to the use of information contained in the input data extending back to the instant of time when the algorithm was initiated. The recursive least squares algorithm starts with known initial conditions while using the information contained in new data samples to update old estimates. The resulting rate of convergence is usually an order of magnitude faster than the LMS algorithm. The improvement, however, is achieved at the expense of an increase in computational complexity over the LMS algorithm. Increased computational complexity also increases processing times.

With a burst signal, there is a limited amount of time for a communications receiver to identify and estimate the impulse response of the wireless communications channel, compensate for the effects of the wireless communications channel on the burst signal, and then decode and validate the data in the burst signal. This is particularly so when the burst signal is a networking waveform that is constrained by time division multiplexing of the RF resources, and processing of the burst signal needs to be completed in order to respond to the transmitter in a timely manner. The longer it takes to identify the wireless communications channel, the less time remains to decode and validate the data since there is a finite time to respond to the burst signal.

U.S. Pat. No. 7,050,513 discloses an approach for communications channel estimation where a channel tracking mechanism generates communications channel estimate updates based on blocks of samples during reception of a message. A weighted recursive least squares (RLS) algorithm implements the estimation process by recursively updating communications channel model parameters upon arrival of new sample data. The communications channel tracking updates channel estimate information once per sample block. An interblock exponential weighting factor is also applied. The block length is chosen short enough to enable good tracking performance while being sufficiently long enough to reduce the overhead of generating preliminary decisions and of updating precalculated tables in the equalizer.

Another approach is disclosed in U.S. Pat. No. 7,907,683 where a pilot-based communications channel estimation process includes receiving a signal that includes information bits transmitted in a wireless communications channel, executing the pilot-based communications channel estimation process having p structures for a vector of pilot structures and an upper bound N for a channel spread, and determining a result of a matrix inversion of a channel correlation matrix for an error channel estimation offline without performing a matrix inversion. Pilot information of the received signal is stored for channel recovery in a transform domain. The Toeplitz inverse is represented by a FFT representation. The process further includes detecting and estimating nonzero taps of a channel impulse response of the wireless communications channel, obtaining a non-structured minimum mean-square-error (MMSE) estimate as a first estimate of locations of the non-zero taps, and replacing the non-structured MMSE estimate by an estimate computed by a tap detection algorithm.

The above approaches for identifying wireless communications channels may still require large amounts of processing, which in turn, increases the processing times. Consequently, there is still a need to improve upon identifying wireless communications channels.

SUMMARY OF THE INVENTION

In view of the foregoing background, it is therefore an object of the present invention to speed up identification of a wireless communications channel for a communications receiver receiving burst signals.

This and other objects, features, and advantages in accordance with the present invention are provided by a communications receiver comprising an antenna, and a burst signal acquisition circuit coupled to the antenna and configured to detect a burst signal received over a wireless communications channel. The burst signal has a burst structure comprising channel-corrupted known preamble bits, channel-corrupted known probe bits and channel-corrupted unknown data bits. A channel estimator is coupled to the burst signal acquisition circuit and is configured to generate a-priori a gain vector based on uncorrupted known probe bits, and to perform a recursive least squares (RLS) operation to determine an impulse response of the wireless communications channel based on the channel-corrupted known data bits and the gain vector. A maximum likelihood sequence estimator (MLSE) or equalizer may be coupled to the channel estimator and the burst signal acquisition circuit.

Pre-calculation of the gain vector advantageously decreases the RLS processing required during probe reception, thus allowing more time for the equalizer to compensate for the effects of the wireless communications channel on the burst signal. The MLSE or equalizer determines the unknown data bits from the received distorted burst signal using an estimate of the wireless communications channel that caused the distortions.

The channel estimator may comprise a memory section for storing the uncorrupted known probe bits. The channel estimator may comprise a gain vector generator section configured to generate the gain vector, and may comprise an RLS algorithm section configured to operate as an adaptive filter in real-time, and to generate a weight vector for determining coefficients of the adaptive filter.

The channel estimator may be further configured to generate a-priori an estimate of an inverse correlation matrix of the burst signal. The channel estimator may be coupled in parallel to the MLSE or equalizer. The burst signal acquisition circuit may be configured to perform at least one correlation between the known preamble bits and bits in the received burst signal.

Another aspect is directed to a method for identifying a wireless communications channel for a communications receiver comprising an antenna, a burst signal acquisition circuit coupled to the antenna, and a channel estimator coupled to the burst signal acquisition circuit. The method comprises operating the burst signal acquisition circuit to detect a burst signal received over the wireless communications channel, with the burst signal having a burst structure comprising channel-corrupted known preamble bits, channel-corrupted known probe bits and channel-corrupted unknown data bits. The method further comprises operating the channel estimator to generate a-priori a gain vector using uncorrupted known probe bits, and to perform a recursive least squares (RLS) operation to determine an impulse response of the wireless communications channel based on the channel-corrupted known probe bits and the gain vector. The method may further comprise operating a MLSE or equalizer coupled to the burst signal acquisition circuit and coupled in parallel to the channel estimator to demodulate or equalize the burst signal to compensate for the effects of the wireless communications channel based on the determined impulse response.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
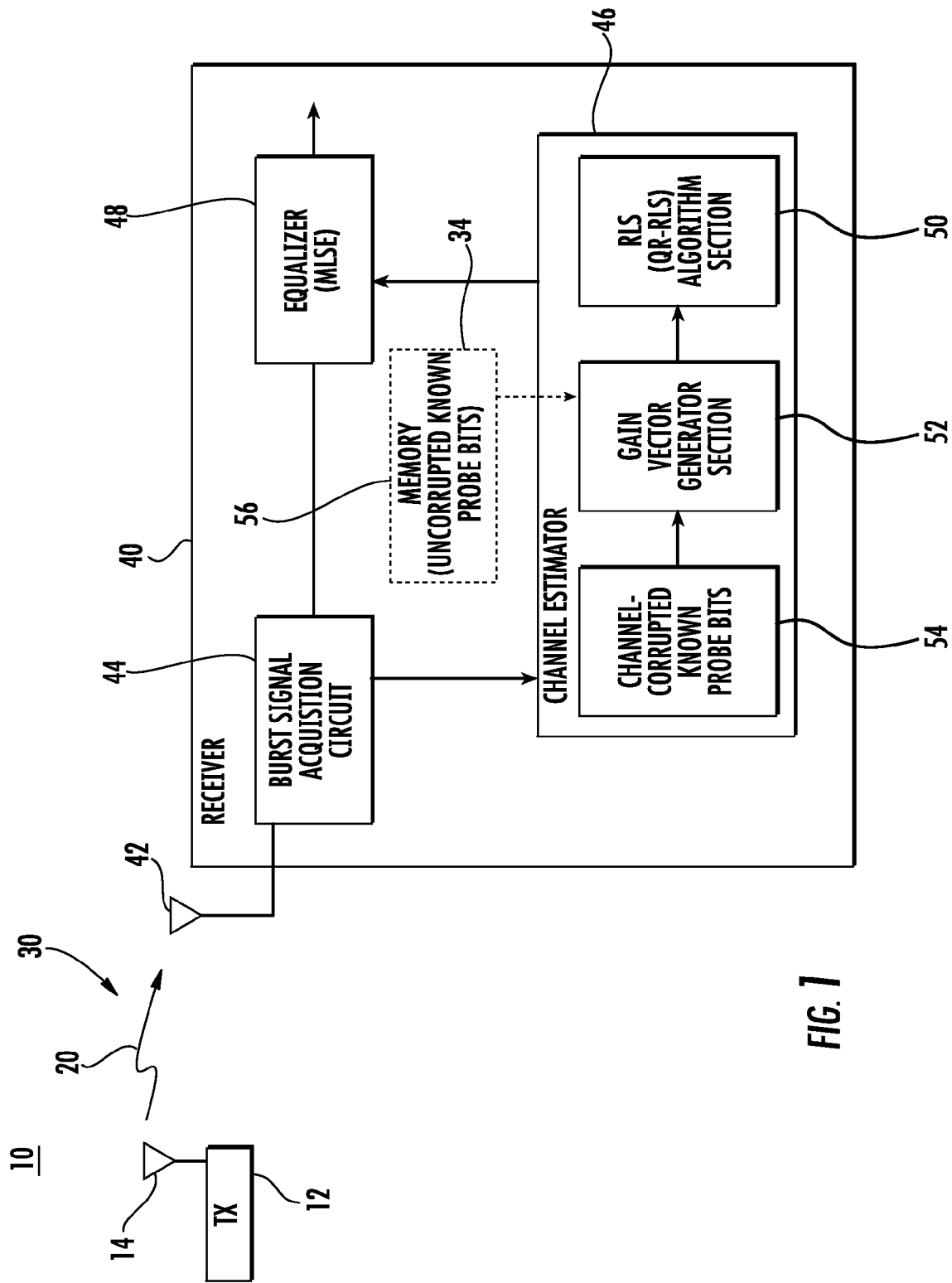
FIG. 1 is a block diagram of a communications system in accordance with the present invention.
Figure 2:
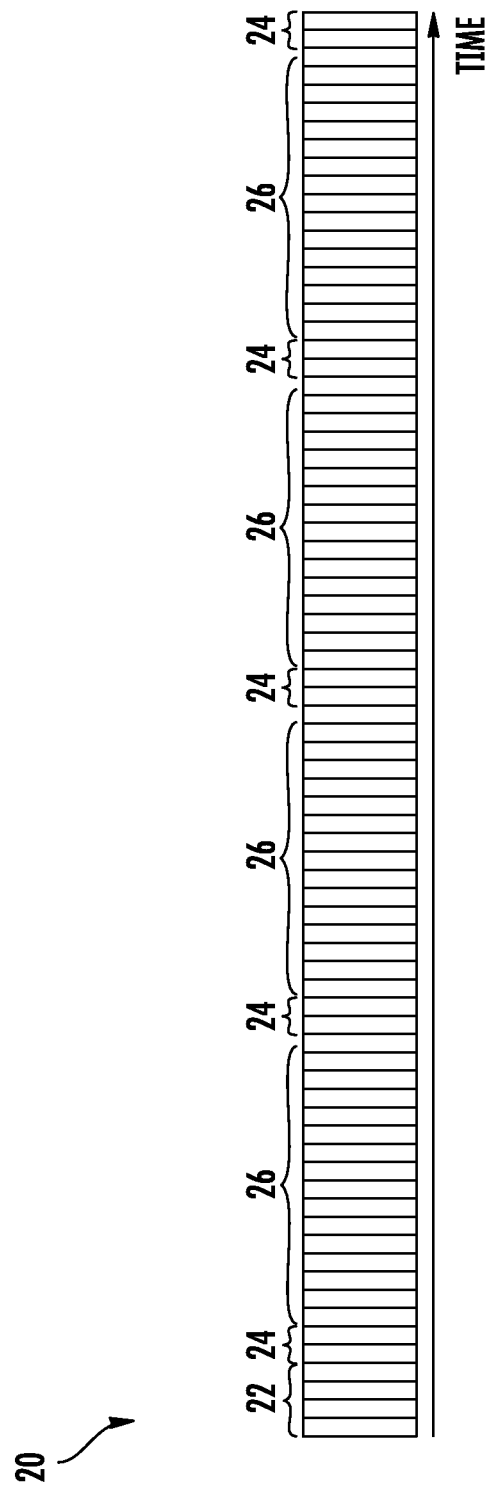
FIG. 2 is a diagram on the structure of a burst signal in accordance with the present invention.

Referring initially to FIGS. 1 and 2, a communications system 10 includes a transmitter 12 and an antenna 14 coupled thereto to transmit a burst signal 20 over a wireless communications channel 30 to a communications receiver 40. The burst signal 20 has a burst structure comprising known preamble bits 22, known probe bits 24 and unknown data bits 26.

The wireless communications channel 30 is the source of various impairments to the burst signal 20 due to factors such as multipath propagation, interference from other users of the frequency spectrum, and time-variation which is more commonly known as fading. Consequently, the known preamble bits 22 are channel-corrupted, the known probe bits 24 are channel-corrupted and the unknown data bits 26 are channel-corrupted.

The communications receiver 40 includes an antenna 42, and a burst signal acquisition circuit 44 coupled to the antenna. Although not illustrated, a low noise amplifier, a mixer stage, and a low pass filter are coupled between the antenna 42 and the burst signal acquisition circuit 44.

The burst signal acquisition circuit 44 is configured to detect a burst signal 20 received over the wireless communications channel 30. A channel estimator 46 is coupled to the burst signal acquisition circuit 44 and is configured to generate a-priori a gain vector based on uncorrupted known probe bits 34, and perform a recursive least squares (RLS) operation to determine an impulse response of the wireless communications channel 30 based on the channel-corrupted known probe bits 34 and the gain vector. A MLSE or equalizer 48 is coupled to the channel estimator 46 and the burst signal acquisition circuit 44.

In other words, the burst signal 20 has a burst structure comprised of preamble bits 22, probe bits 24 and data bits 26. The preamble bits 22 and probe bits 24 are known to the receiver 40. The data bits 26 are not known to the receiver 40. The receiver 40 receives the burst signal 20 with channel corruption. The receiver 40 determines the expected preamble bits and probe bits prior to reception of the burst signal 20. The receiver 40 contains a burst signal acquisition circuit 44 which allows for reception of a burst signal 20 corrupted by the RF channel 30. A channel estimator 46 is coupled to the burst signal acquisition circuit 44 that utilizes the available preamble bits known to the receiver without corruption to generate a-priori a gain vector based on the known probe bits 34. The channel estimator 46 performs a recursive least squares (RLS) operation to determine the impulse response of the wireless communications channel based on the channel-corrupted probe-bits 24 received by the burst signal acquisition circuit 44 and the gain vector generated a-priori. A MLSE or equalizer 48 is coupled to the channel estimator 46 and the burst signal acquisition circuit 44.

As illustrated in FIG. 2, the first part of a typical burst signal 20 is the channel-corrupted known preamble bits 22 which are a known sequence of ones and zeros. The burst signal acquisition circuit 44 may be configured as a correlator, for example, for comparing the received preamble bits 22 to the known preamble bits. When there is a high correlation, then a burst signal 20 has been detected.

Sequences of channel-corrupted known probe bits 24 are repeated within the unknown data bits 26. The known probe bits 24 are used to determine the characteristics of the wireless communications channel 30, as readily appreciated by those skilled in the art. In networking communications systems, where burst signals 20 are commonly used, the time to identify the wireless communications channel 30 and determine the unknown data bits 26 is constrained by time division multiplexing of the RF frequency spectrum, for example. Determination of the unknown data bits 26 needs to be completed within a finite time period so as to be able to respond to the transmitter 10 within a finite turnaround time.

Once the burst signal acquisition circuit 44 determines that a burst signal 20 has been received, the burst signal is provided in parallel to the MLSE or equalizer 48 and to the channel estimator 46. The channel estimator 46 may be configured as a field programmable gate array (FPGA) or a digital signal processor (DSP), for example.

The channel estimator 46 includes an RLS algorithm section 50 and a gain vector generator section 52. The RLS algorithm section 50 performs RLS operations to determine an impulse response of the wireless communications channel 30. The RLS algorithm section 50 is also known as implementing an adaptive filter. In one embodiment, the RLS algorithm section 50 is a standard RLS algorithm, and is based on the following equations:

$$k(n) = \frac{\lambda^{-1}P(n-1)u(n)}{1+\lambda^{-1}u^H(n)P(n-1)u(n)} \quad (1)$$

$$P(n) = \lambda^{-1}P(n-1) - \lambda^{-1}k(n)u^H(n)P(n-1) \quad (2)$$

$$\xi(n) = d(n) - \hat{w}^H(n-1)u(n) \quad (3)$$

$$\hat{w}(n) = \hat{w}(n-1) + k(n)\xi^*(n) \quad (4)$$

Equation (1) is referred to as the gain vector k(n), and is based on the known probe bits u(n) 24, an estimate of the inverse correlation matrix P(n) of the burst signal 20, which is Equation (2), and the forgetting factor A which gives exponentially less weight to older error samples. Both Equations (1) and (2) do not depend on the wireless channel taps, and consequently, the entirety of the gain vector or portions thereof can be pre-calculated, i.e., a-priori generated by the gain vector generator section 52.

The uncorrupted known probe bits u(n) 34 are made available to the gain vector generator section 52 via a memory section 54 within the channel estimator 46. Alternatively, a memory 56 separate from the channel estimator 46 may be used, where the memory interfaces with the channel estimator to provide the uncorrupted known probe bits u(n) 34.

Equation (3) generates the error signal (n), and Equation (4) is the weight vector ŵ(n) for determining the coefficients of the adaptive filter, which may be characterized as a finite impulse response (FIR) filter of order N with N+1 taps. A FIR filter is a filter whose impulse response is of finite duration because it settles to zero in finite time. The output of the RLS algorithm section 50 is a weighted sum of the current and a finite number of previous values of the burst signal 20.

As readily appreciated by those skilled in the art, the idea behind the RLS algorithm is to minimize a cost function by appropriately selecting the filter coefficients ŵ(n), and updating the filter as new data arrives. The cost function is minimized by taking the partial derivatives for all entries of the gain vector k(n) of the weight vector ŵ(n) and setting the results to zero.

Pre-calculation of the gain vector k(n) advantageously decreases the RLS processing time during probe reception, thus allowing more time for the MLSE or equalizer 48 to compensate for the effects of the wireless communications channel 30 on the burst signal 20. The MLSE or equalizer 48 determines the unknown data bits 26 from the received distorted burst signal 20 using an estimate of the wireless communications channel 30 that caused the distortions.

The above discussion directed to performing an RLS operation to determine an impulse response of the wireless communications channel 30 based on channel-corrupted known probe bits 24 and the gain vector (as generated a-priori based on uncorrupted known probe bits 34) may also be applied to other types of algorithms falling within the RLS algorithm family, as readily appreciated by those skilled in the art. The family of RLS algorithms includes, for example, a QR decomposed-based RLS (QR-RLS) algorithm, a fast transversal filter RLS (FTF-RLS) algorithm, a lattice RLS (LRLS) algorithm, and a normalized lattice RLS (NLLRLS) algorithm.

When the QR decomposed-based RLS (QR-RLS) algorithm is implemented, for example, it diverges when the inverse correlation matrix P(n) loses the properties of positive definiteness or Hermitian symmetry. The diverging of the standard RLS algorithm limits the application of this algorithm. The QR-RLS algorithm can resolve this instability.

Instead of working with the inverse correlation matrix P(n) of the input signal, the QR-RLS algorithm performs QR decomposition directly on the correlation matrix of the input signal. Consequently, this algorithm provides the property of positive definiteness and is more numerically stable than the standard RLS algorithm. However, the QR-RLS algorithm requires more computational resources than the standard RLS algorithm.

The corresponding gain vector of the QR-RLS algorithm is represented in its inverse square root form. The decomposition uses a sequence of Givens rotations. By storing the resulting coefficients of Givens rotations, a-priori calculations can be performed. When the known data bits 24 become available, they are pre-processed using the stored Givens rotation values. The inverse of the square-root correlation matrix may also be created a-priori. Using these two a-priori created calculations, an estimate of the wireless communications channel 30 may be determined with the following equation:

$$\hat{w}^H(n) = P^H(n)\Phi^{-1/2}(n) \quad (5)$$

Figure 3:
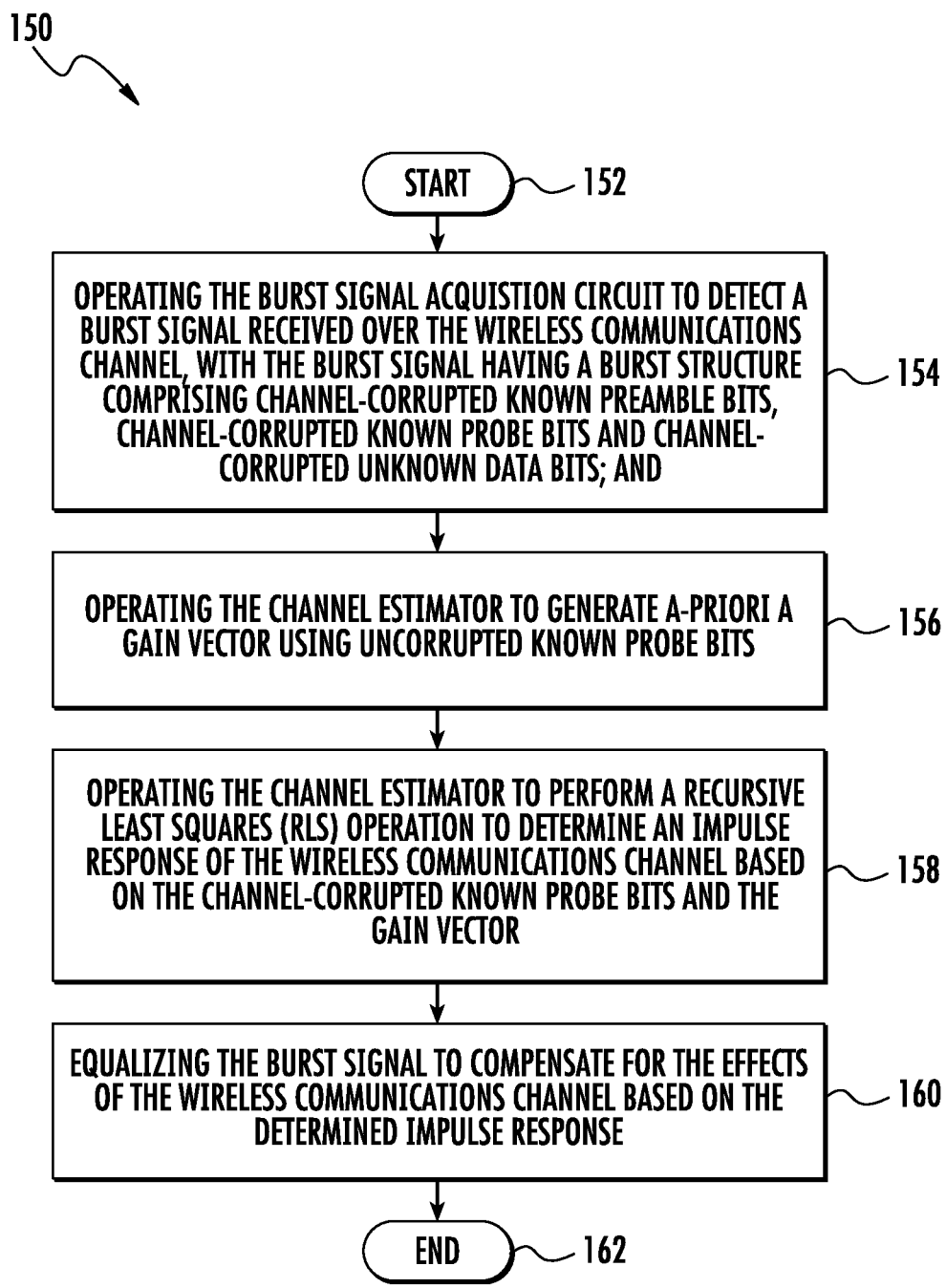
FIG. 3 is a flowchart illustrating a method for identifying a wireless communications channel for a communications receiver in accordance with the present invention.

A flowchart 150 illustrating a method for identifying a wireless communications channel 30 for a communications receiver 40 will now be discussed in reference to FIG. 3. From the start (Block 152), the method comprises operating the burst signal acquisition circuit 44 at Block 154 to detect a burst signal 20 received over the wireless communications channel 30, with the burst signal having a burst structure comprising channel-corrupted known preamble bits 22, channel-corrupted known probe bits 24 and channel-corrupted unknown data bits 26. The method further comprises operating the channel estimator 46 to generate a-priori a gain vector using uncorrupted known probe bits 34 at Block 156, and to perform a recursive least squares (RLS) operation, either following the standard RLS algorithm or the QR-RLS algorithm, at Block 158 to determine an impulse response of the wireless communications channel 30 based on the channel-corrupted known probe bits and the gain vector. The method further comprises operating an equalizer 48 coupled to the burst signal acquisition circuit 44 and coupled in parallel to the channel estimator 46 at Block 160 to equalize the burst signal 20 to compensate for the effects of the wireless communications channel 30 based on the determined impulse response. The method ends at Block 162.

Many modifications and other embodiments of the invention will come to the mind of one skilled in the art having the benefit of the teachings presented in the foregoing descrip- That which is claimed is:

1. A communications receiver comprising:
a burst signal acquisition circuit configured to detect a burst signal received over a wireless communications channel and having a burst structure comprising channel-corrupted known preamble bits, channel-corrupted known probe bits and channel-corrupted unknown data bits; and
a channel estimator coupled to said burst signal acquisition circuit and comprising
a gain vector generator section configured to generate a-priori a) an estimate of a correlation matrix of the burst signal, and b) a gain vector based on uncorrupted known probe bits, and
a RLS algorithm section configured to operate as an adaptive filter and perform a QR decomposed-based recursive least squares (RLS) operation on the correlation matrix and based on pre-processed known data bits using stored Givens rotation values to determine an impulse response of the wireless communications channel based on the channel-corrupted known probe bits and the a-priori pre-calculated gain vector.

2. The communications receiver according to claim 1 further comprising an equalizer coupled to said channel estimator and said burst signal acquisition circuit.

3. The communications receiver according to claim 1 further comprising a maximum likelihood sequence estimator (MLSE) coupled to said channel estimator and said burst signal acquisition circuit.

4. The communications receiver according to claim 1 wherein said channel estimator comprises a memory section for storing the uncorrupted known probe bits.

5. The communications receiver according to claim 1 wherein said RLS algorithm section is configured to operate as an adaptive filter in real-time, and to generate a weight vector for determining coefficients of the adaptive filter.

6. The communications receiver according to claim 2 wherein said channel estimator is coupled in parallel to said equalizer.

7. The communications receiver according to claim 3 wherein said channel estimator is coupled in parallel to said MLSE.

8. The communications receiver according to claim 1 wherein said channel estimator comprises a field programmable gate array (FPGA).

9. The communications receiver according to claim 1 wherein said channel estimator comprises a digital signal processor (DSP).

10. The communications receiver according to claim 1 wherein said burst signal acquisition circuit is configured to perform at least one correlation between the known preamble bits and bits in the received burst signal.

11. The communications receiver according to claim 1 further comprising an antenna coupled to said burst signal acquisition circuit.

12. A communications system comprising:
a transmitter configured to transmit a burst signal over a wireless communications channel, with the burst signal having a burst structure comprising known preamble bits, known probe bits and unknown data bits; and
a receiver comprising
a burst signal acquisition circuit configured to detect the burst signal received over the wireless communications channel, with the received burst signal being channel-corrupted by the wireless communications channel, and
a channel estimator coupled to said burst signal acquisition circuit and comprising
a gain vector generator section configured to generate a-priori a) an estimate of a correlation matrix of the burst signal, b) a gain vector based on uncorrupted known probe bits, and
a RLS algorithm section configured to operate as an adaptive filter and perform a QR decomposed-based recursive least squares (RLS) operation on the correlation matrix and based on pre-processed known data bits using stored Givens rotation values to determine an impulse response of the wireless communications channel based on the channel-corrupted known probe bits and the a-priori pre-calculated gain vector.

13. The communications system according to claim 12 wherein said channel estimator comprises a memory section for storing the uncorrupted known probe bits.

14. The communications system according to claim 12 wherein said RLS algorithm section is configured to operate as an adaptive filter in real-time, and to generate a weight vector for determining coefficients of the adaptive filter.

15. The communications system according to claim 12 wherein said channel estimator comprises at least one of a field programmable gate array (FPGA) and a digital signal processor (DSP).

16. The communications system according to claim 12 wherein said burst signal acquisition circuit is configured to perform at least one correlation between the known preamble bits and bits in the received burst signal.

17. A method for identifying a wireless communications channel for a communications receiver comprising a burst signal acquisition circuit, and a channel estimator coupled to the burst signal acquisition circuit, the method comprising:
operating the burst signal acquisition circuit to detect a burst signal received over the wireless communications channel, with the burst signal having a burst structure comprising channel-corrupted known preamble bits, channel-corrupted known probe bits and channel-corrupted unknown data bits; and
operating the channel estimator to
generate a-priori within a gain vector generator section a) an estimate of a correlation matrix of the burst signal, and b) a gain vector using uncorrupted known probe bits, and
perform a QR decomposed-based recursive least squares (RLS) operation on the correlation matrix and based on pre-processed known data bits using stored Givens rotation values within a RLS algorithm section operating as an adaptive filter to determine an impulse response of the wireless communications channel based on the channel-corrupted known probe bits and the a-priori pre-calculated gain vector.

18. The method according to claim 17 further comprising storing the uncorrupted known probe bits in a memory.

19. The method according to claim 17 wherein the RLS algorithm section operates as an adaptive filter in real-time, and for generating a weight vector for determining coefficients of the adaptive filter.

20. The method according to claim 17 further comprising operating an equalizer coupled to the burst signal acquisition circuit and coupled in parallel to the channel estimator.

21. The method according to claim 17 further comprising operating a maximum likelihood sequence estimators (MLSE) coupled to the burst signal acquisition circuit and coupled in parallel to the channel estimator.

22. The method according to claim 17 wherein the burst signal acquisition circuit performs at least one correlation between the known preamble bits and bits in the received burst signal.

* * * * *